Figure 1:
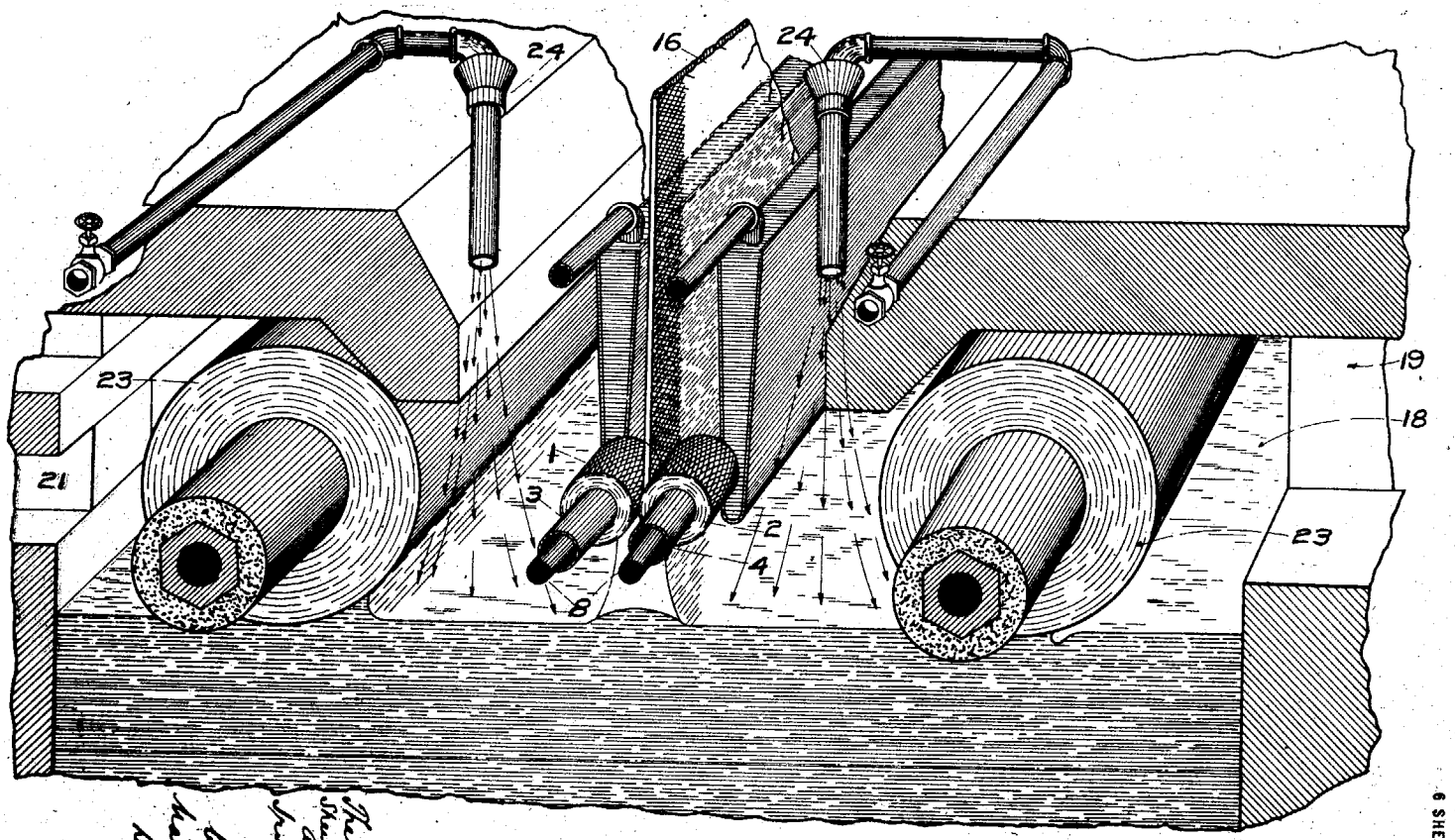

I. W. COLBURN, DEC'D.

THE LIBBEY-OWENS SHEET GLASS COMPANY, ASSIGNEE.

METHOD OF AND APPARATUS FOR DRAWING SHEET GLASS.

APPLICATION FILED NOV. 29, 1919.

Reissued Jan. 27, 1920.

14,794.

6 SHEETS—SHEET 1.

The Libbey-Owens Sheet Glass Company, Assignee of Irving W. Colburn, Deceased, by Mauro, Cameron, Lewis & Herkamp, Attorneys.

I. W. COLBURN, DEC'D.

THE LIBBEY-OWENS SHEET GLASS COMPANY, ASSIGNEE.

METHOD OF AND APPARATUS FOR DRAWING SHEET GLASS.

APPLICATION FILED NOV. 29, 1919.

Reissued Jan. 27, 1920.

14,794.

6 SHEETS—SHEET 2.

The Libbey-Owens Sheet Glass Company, assignee of Irving W. Colburn, deceased, by Mauro, Gunson, Lewis & Kirkham, Attorneys.

I. W. COLBURN, DEC'D.

THE LIBBEY-OWENS SHEET GLASS COMPANY, ASSIGNEE.

METHOD OF AND APPARATUS FOR DRAWING SHEET GLASS.

APPLICATION FILED NOV. 29, 1919.

Reissued Jan. 27, 1920.

14,794.

6 SHEETS—SHEET 3.

The Libbey-Owens Sheet Glass Company,
assignee of Irving W. Colburn, deceased,
by
Munro, Cushman, Lewis & Herkamp, Attorneys.

I. W. COLBURN, DEC'D.

THE LIBBEY-OWENS SHEET GLASS COMPANY, ASSIGNEE.

METHOD OF AND APPARATUS FOR DRAWING SHEET GLASS.

APPLICATION FILED NOV. 29, 1919.

Reissued Jan. 27, 1920.

14,794.

6 SHEETS—SHEET 4.

The Libbey-Owens Sheet Glass Company,
assignee of Irving W. Colburn, deceased,
by
Shaw, Cameron, Lewis & Kenyon,
Attorneys.

I. W. COLBURN, DEC'D.
THE LIBBEY-OWENS SHEET GLASS COMPANY, ASSIGNEE.
METHOD OF AND APPARATUS FOR DRAWING SHEET GLASS.
APPLICATION FILED NOV. 29, 1919.
Reissued Jan. 27, 1920.
14,794.
6 SHEETS—SHEET 5.
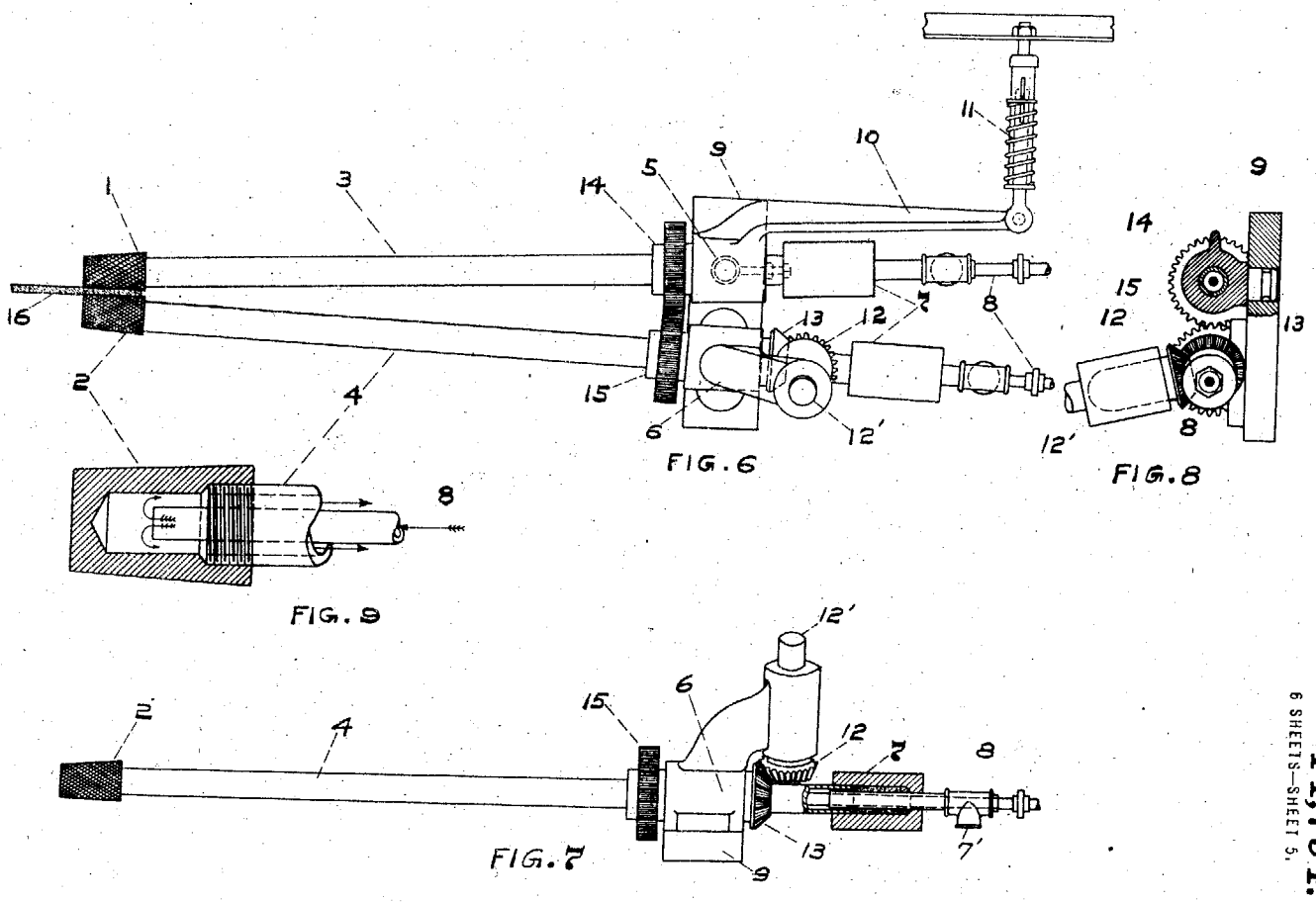
The Libbey-Owens Sheet Glass Company,
assignee of Irving W. Colburn, deceased,
by
Munro, Cameron, Lewis & Herman,
Attorneys.

I. W. COLBURN, DEC'D.

THE LIBBEY-OWENS SHEET GLASS COMPANY, ASSIGNEE.

METHOD OF AND APPARATUS FOR DRAWING SHEET GLASS.

APPLICATION FILED NOV. 29, 1919.

Reissued Jan. 27, 1920.

14,794.

6 SHEETS—SHEET 6.

The Libbey-Owens Sheet Glass Company,
Assignee of Irving W. Colburn, Deceased,
by
Munro, Cameron, Lewis & Williams, Attorneys.

UNITED STATES PATENT OFFICE.

IRVING W. COLBURN, DECEASED, LATE OF TOLEDO, OHIO, BY THE LIBBEY-OWENS SHEET GLASS COMPANY, OF TOLEDO, OHIO, A CORPORATION OF OHIO, ASSIGNEE.

METHOD OF AND APPARATUS FOR DRAWING SHEET-GLASS.

14,794. Specification of Reissued Letters Patent. Reissued Jan. 27, 1920.

Original application filed January 29, 1908, Serial No. 413,296. Renewed March 26, 1912, Serial No. 686,460. Original No. 1,160,692, dated November 16, 1915. Application for reissue filed November 29, 1919. Serial No. 341,533.

*To all whom it may concern:*

Be it known that IRVING W. COLBURN, deceased, and late a citizen of the United States of America, and a resident of Toledo, Ohio, duly invented a new and useful Improvement in Methods of and Apparatus for Drawing Sheet-Glass, which invention is fully set forth in the following specification.

This invention relates to the art of drawing glass in sheet form from a mass of molten glass.

When efforts are made to draw a sheet of glass from a molten mass of glass there is a tendency upon the part of the sheet being drawn to rapidly narrow, and unless means are provided for overcoming such tendency the sheet will soon pull to a string or thread.

In a number of U. S. patents some of which were granted to me solely and some jointly with Edgar Washburn, there are disclosed certain methods and apparatus for drawing glass in sheet form, which methods and forms of apparatus include steps and mechanism for maintaining the width of the sheet during the drawing operation. These methods and forms of apparatus disclosed in the patents aforesaid in practice have proved efficient.

The method and apparatus constituting the present invention are designed to be used in connection with any suitable sheet glass drawing apparatus, and is particularly applicable to a machine of the character set forth in my U. S. Patent 836,439, and my U. S. application Serial No. 368,096, filed April 13, 1907.

The particular object of the present invention is to provide a method and apparatus for avoiding or overcoming the narrowing of the sheet of glass during the drawing operation, which method and apparatus shall be more efficient in practice, simple to construct, and more readily operated than those known in the art prior to the present invention.

With these objects in view, the invention resides in the method of drawing sheet glass, which consists in preparing a mass of molten glass whose temperature at the points where the edge portions of the sheet emerge from said molten mass is lower than is the temperature of the molten mass as a whole, and particularly lower than the temperature of the molten mass along the line where the sheet of glass emerges from the molten mass between said points of lower temperature, and then drawing a sheet of glass from said mass thus prepared with the main body portion of the glass emerging from the molten mass which has the higher temperature, while the edge portions of the sheet emerge or are drawn from the two parts of the molten mass having the lower temperature.

The invention further consists in regulating the temperature of the molten mass passing into the edge portions of the sheet and the temperature of the molten mass passing into the main or middle portion of the sheet, so that the desired difference in temperature between the middle and the edge portions may be maintained at the point where the best results may be obtained. These will vary for different thicknesses of glass to be drawn and the rates of movement of the sheet during the drawing operation.

The invention further consists in applying a drawing action to the sheet as a whole, and in addition thereto applying a drawing action to the edge portions of the sheet, which drawing action may be regulated as to its rapidity of movement with relation to the drawing action exerted upon the sheet as a whole.

The invention further resides in a receptacle for a mass of molten glass, combined with means for applying heat to the molten mass in the receptacle, said receptacle and means being so constructed and combined that the portions of the molten mass in the receptacle from which the edge portions of the sheet are drawn shall be of a lower temperature than the middle or main portions of the receptacle from which the main body of the sheet of glass is drawn.

The invention further resides in connection with a suitable receptacle for molten glass of the general character last described of means acting to draw the sheet of glass as a whole from the molten mass, combined with drawing means acting solely upon the edge portions of the sheet and to assist in the drawing operation so far as the edge portions are concerned. Under some conditions, in order to obtain the best results, it may be found desirable to drive the main sheet-glass drawing means of the machine at a different rate of speed from that of the means for drawing the edge portions of the sheet, and with this object in view, means are provided whereby said edge portions may be operated at a different speed from that of the main sheet-drawing portions; and also means whereby the two sets of edge-drawing portions may, if desired, be driven, the one at a different rate of speed from the other.

The method of this invention may be practised in various forms without departing from the spirit of the invention, and the inventive idea involved in the apparatus is capable of a variety of mechanical expressions. For the purpose of illustrating the invention, one form of such apparatus is shown in the accompanying drawings, in which—

Figure 2:
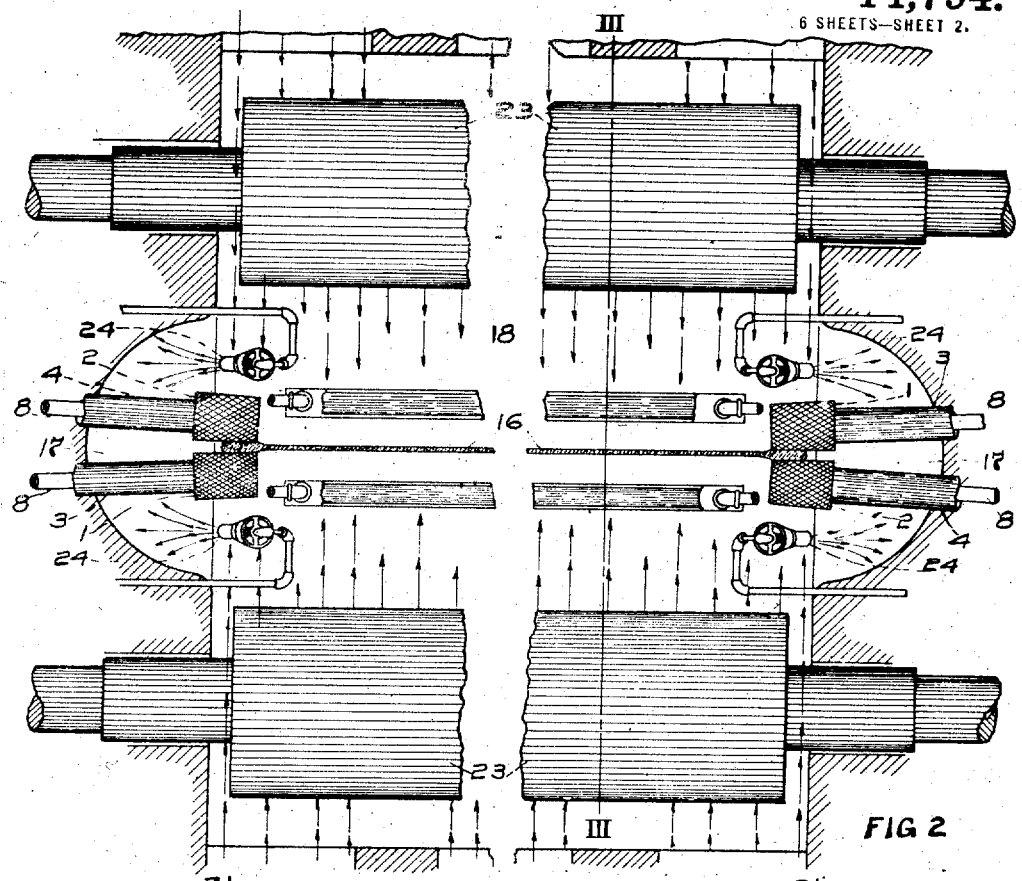
Figure 3:
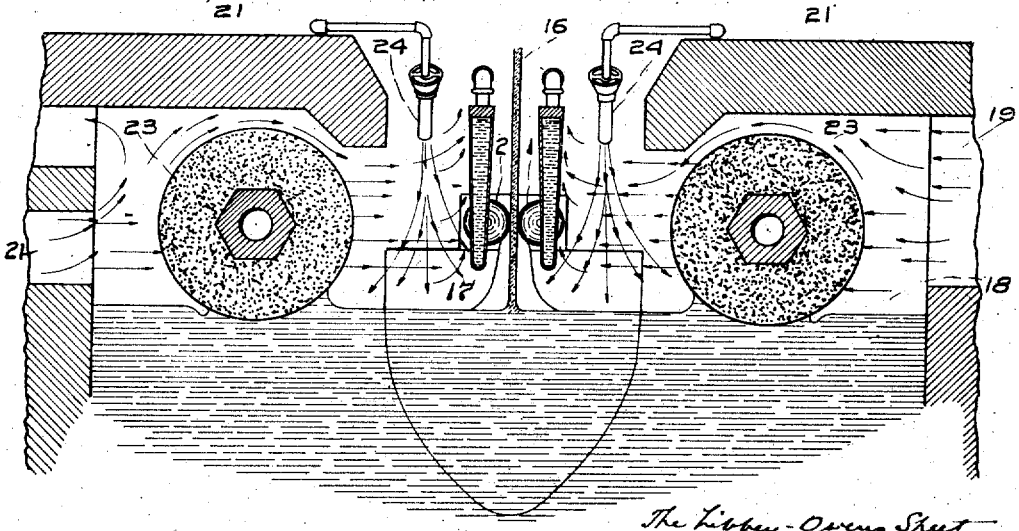
Figure 4:
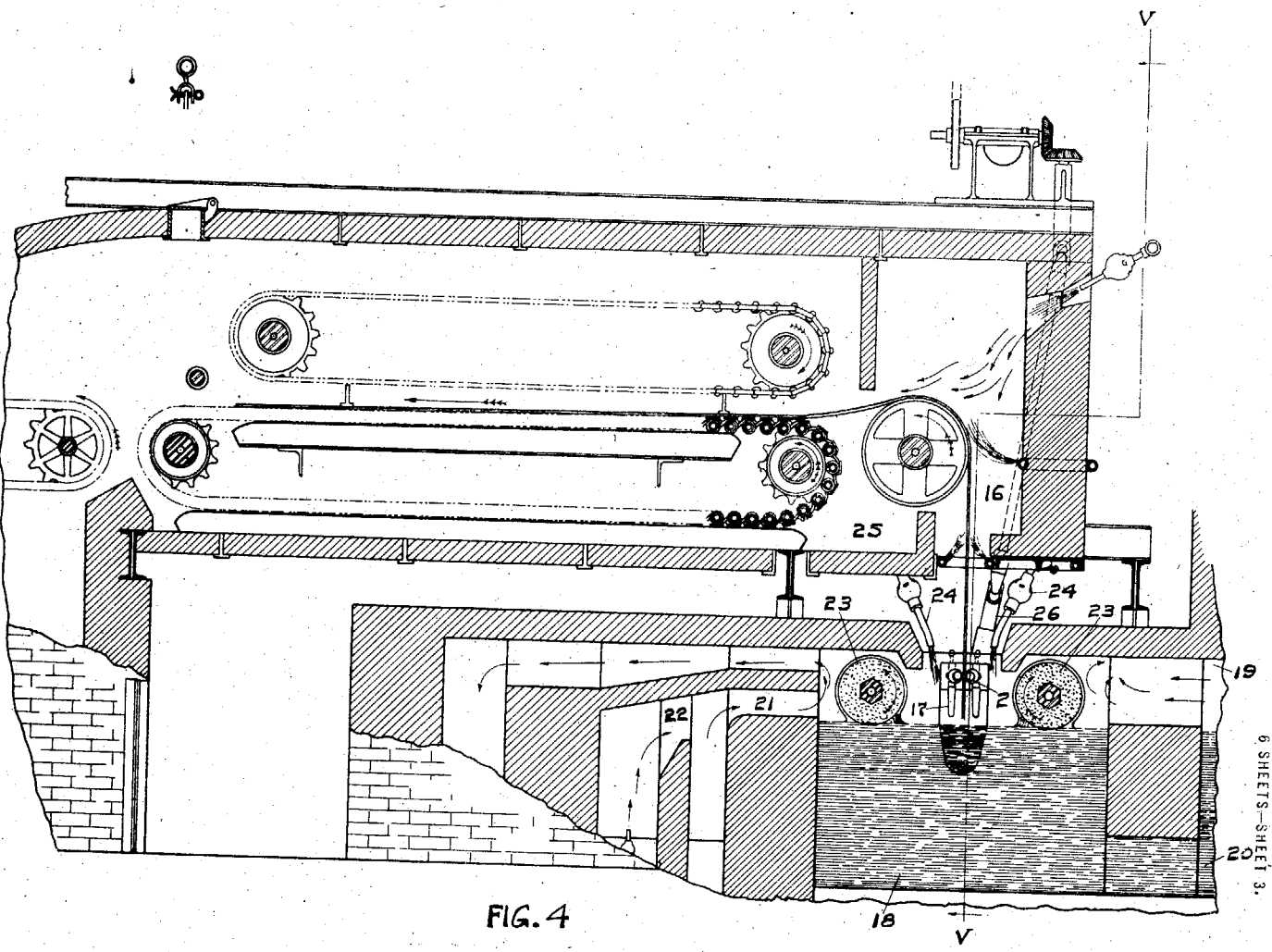
Figure 5:
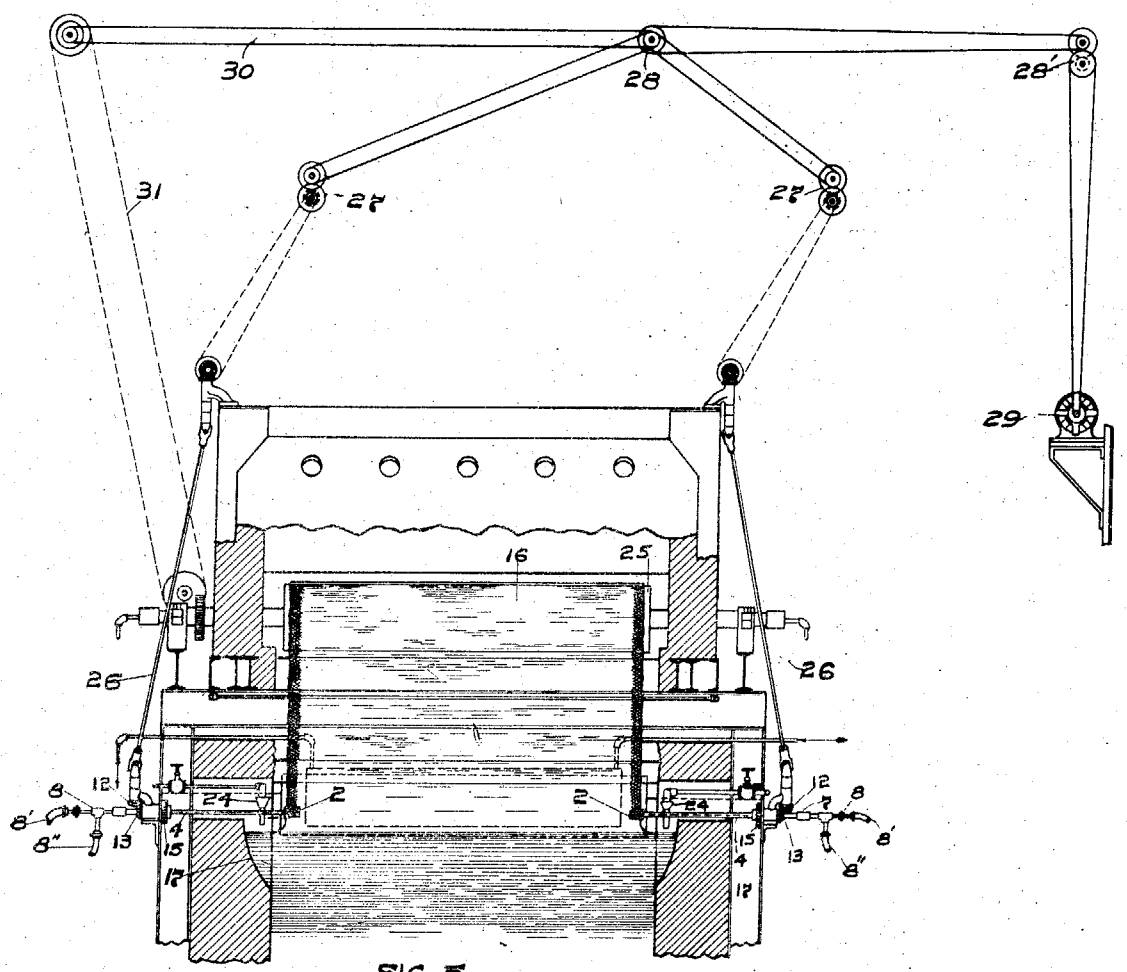
Figure 10:
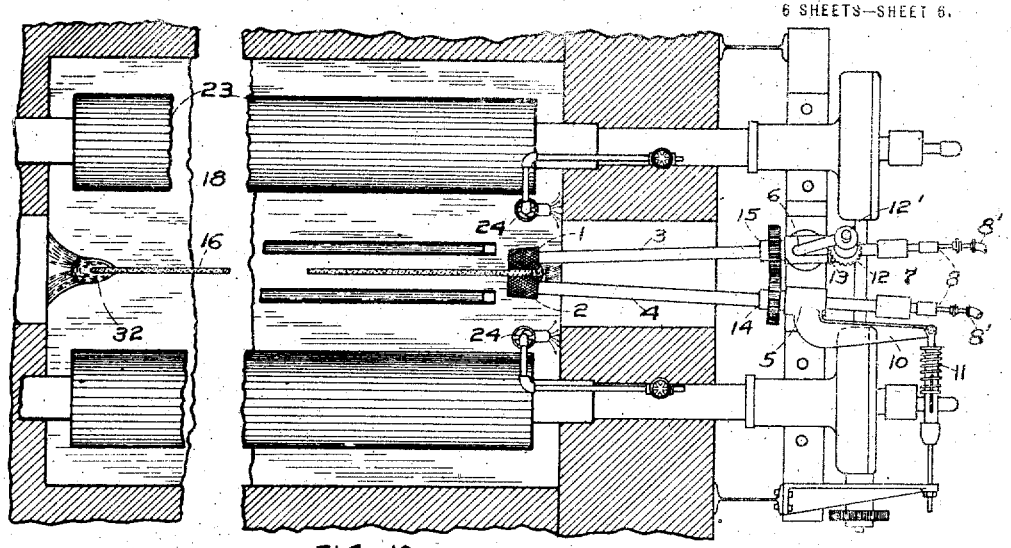
Figure 11:
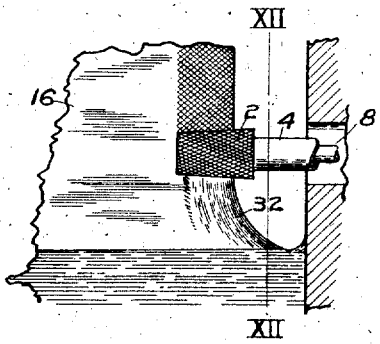
Figure 13:
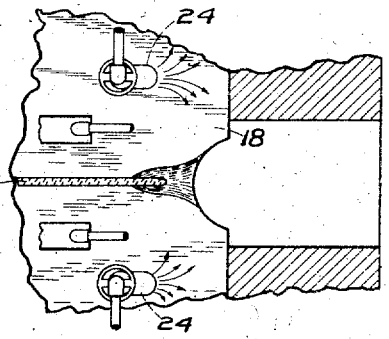
Figure 12:
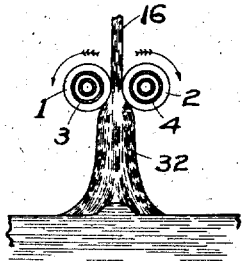
Figure 14:
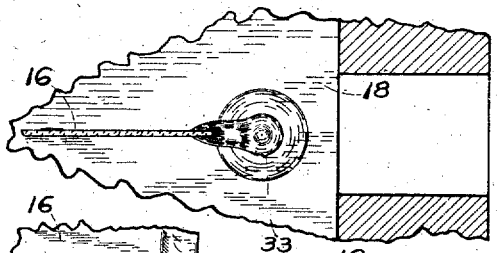
Figure 15:
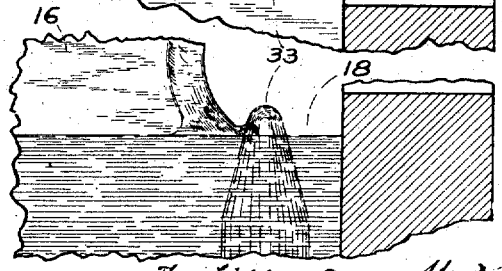

Figure 1 is a broken detailed perspective; Fig. 2 is a top plan view with parts broken away and the top or cover of the working chamber removed; Fig. 3 is a transverse section on the line III—III of Fig. 2; Fig. 4 is a vertical and longitudinal section of the working chamber end of my continuous glass-working machine shown in my application No. 368,096, with my improved width-holding or maintaining device applied thereto instead of the width-holding or maintaining devices shown in said application; Fig. 5 is a vertical transverse section on the line V—V, Fig. 4, parts being shown in elevation; Fig. 6 is a top plan view of the edge-engaging or supplemental drawing rolls and their operating mechanism; Fig. 7 is a side elevation of Fig. 6, and Fig. 8 is an end elevation, parts being shown in section; Fig. 9 is a broken sectional detail illustrating the means for cooling the supplemental rolls; Fig. 10 is a plan view of a working chamber, in which the cooler area from which the edge portion of the sheet emerges differs somewhat in form from that shown in Fig. 2; Fig. 11 is a side elevation of the lower portion of the edge of a sheet as it is being drawn in a working chamber such as that shown in Fig. 10; Fig. 12 is a sectional view on the line XII—XII, Fig. 11; and Figs. 13, 14 and 15 illustrate modified methods of obtaining the cooler edge-forming areas.

Like numerals indicate like parts throughout the several views.

Figs. 1, 2, 3, 4, 5 and 10 all disclose sufficient portions of the working chamber and drawing apparatus shown in my said application No. 368,096, to clearly illustrate the relation and application of my present invention thereto.

In carrying out my improved process, any suitable form of sheet drawing machine may be employed, but preferably I use the form of working chamber and drawing apparatus shown in my said application, Sr. No. 368,096. In the present invention, however, the revoluble spheres shown in said application are omitted, and the sheet is maintained of uniform width and the edge portions of the sheet drawn by the apparatus and in the manner now to be described.

Referring to the drawings, and particularly to Figs. 1, 2, 6, 7, 8 and 9, two rolls 1 and 2, each preferably having a milled or knurled surface, are mounted upon tubular shafts 3, 4, respectively, which pass revolubly through bearings 5 and 6. Stuffing boxes 7 are provided on the exterior ends of the shafts 3, 4, and through said boxes pipes 8, 8 pass within the tubular shafts 3, 4, and terminate within the hollow rolls 1, 2, within a short distance of the end of said rolls. Water or other cooling fluid enters through the pipes 8 and is conducted to the rolls 1, 2, and passes outward between the exterior of the pipes 8 and the interior of the tubular shafts 3, 4, and passes by way of the outlet 7′ to the sewer or other suitable place of discharge. The bearing 6 is rigidly mounted upon a suitable base 9, while bearing 5 is so mounted on said base as to be capable of a slight horizontally rotative movement, in order that the roll 1 may be withdrawn from or caused to approach toward the roll 2, as desired. A lever 10 is rigidly attached to the bearing 5 and projects rearward, and at the outer end of said lever is attached a spring connection 11, the normal action of which is to press the roll 1 toward the roll 2, as will be clearly understood from inspection of Fig. 6. Motion is imparted to shaft 4 through the medium of beveled gears 12 and 13, and is transmitted to shaft 3 through the intermeshing spur gears 14 and 15, which are keyed to or otherwise secured to the shafts 3 and 4 respectively. The beveled gear 12 is keyed to the shaft 12′ to which power is applied for revolving the rolls, in a manner hereinafter set forth. As thus constructed, one set of the drawing rolls is mounted upon each side of the working chamber of the continuous glass-drawing machine, the rolls being in proper position to engage the edge portions of the sheet being drawn.

The sheet 16 may be started by means of a bait or other suitable device in any usual or well-known manner, and the drawing operation, if preferred, may be continued by means such as those fully set forth in my said application, Sr. No. 368,096. By the present invention, however, the edge portions of the sheet are drawn from a portion of the molten glass in the working chamber which has a lower temperature than the remainder of the molten mass or that portion of the molten mass from which the main body of the sheet is drawn. Any suitable means for providing areas of lower temperature from which to draw the edge portions may be employed. Preferably, I provide the working chamber with side recesses or bays 17 (see Fig. 2) for the purpose of securing areas in the molten mass which are of a lower temperature than that of the main portion existing in the body of the working chamber 18. It is essential that the areas of the molten glass from which the edge portions of the sheet are drawn should be of lower temperature than the main portions, and it is desirable, if not essential, that means should be provided for regulating the temperature of these areas of lower temperature, to the end that the plasticity of the molten glass within these areas of lower temperature may be such as to produce the best results.

Referring to Figs. 1, 2, 3 and 4, by far the larger portion of the heat of the working chamber 18 is received through the flues 19 leading from the melting furnace 20, and through the flues 21 leading from the combustion chamber 22, and this heat takes the course indicated by the numerous arrows in Figs. 2 and 3. A portion of the heated gases of combustion pass over and by the ends of the rib-annihilating or skimming rolls 23. In addition to this, said rolls become highly heated and large quantities of heat are delivered by radiation to the areas of the working chamber between the rolls as they are revolved. It will be noted that bays 17, 17, are not so directly exposed to the action of any of this heat as are the other portions of the working chamber, and hence the temperature therein is normally somewhat lower, and the glass therein consequently somewhat less plastic, than in the main or central portion of the working chamber. In fact, the glass in the bays 17 would soon become comparatively cold, and would be unworkable if means were not provided for heating the glass within said bays. For this purpose I provide suitable burners, such as the Bunsen burners 24, 24, whereby heat may be directed into the bays and upon the edge-forming area of the molten glass, the temperature of the glass in said bays, however, being easily regulated by controlling said burners.

As the sheet is drawn, the edge portions thereof are drawn from or formed from the molten glass in or immediately adjacent to said bays, where the glass is cooler, and consequently thicker or more viscous, than that in the main portion of the working chamber from which the main body of the sheet is drawn. From this it results that the edge portions of the sheet are more tenacious and less tractable or pliable than the main body of the sheet, and this results in the edge portions of the sheet as they emerge from the mass of molten glass being thicker than that of the main body of the sheet. It therefore becomes necessary to employ means for reducing the thickness of said edges, to the end that they may be of substantially uniform thickness with the sheet proper, in order that the sheet will pass properly over the bending roll 25 (Fig. 4) and down through the drawing chamber and annealing oven. Moreover, by reason of the lower temperature, with the consequent increased viscosity and tenacity of the glass from which the edge portions of the sheet are drawn, the resistance incident to drawing the edge portions of the sheet is greater than that obtaining in the main body or middle portions of the sheet, and in order to overcome this additional or increased resistance, and in order that the draft tension upon the entire sheet may be uniform or equalized throughout the width or transverse section thereof, I employ the supplemental drawing rolls shown in Figs. 6, 7, 8 and 9, and hereinbefore described. One set of said drawing rolls is mounted upon each side of the working chamber 18 in close proximity to the mass of molten glass, and so positioned that each set of rolls is in position to receive between them one edge of the sheet being drawn, while the shafts of said rolls extend horizontally outward, as clearly shown in Figs. 2 and 5. For the purpose of driving the rolls, shafts 12′, 12′, are attached each to a shaft 26 (see Fig. 5), each driven independently from variable speed pulleys 27, 27, which are in turn driven by a jack-shaft 28 to which motion is transmitted through a variable speed pulley 28′, receiving motion from any suitable source of power, here shown as an electric motor 29. The other portions of the drawing mechanism are driven by shaft 28 through the medium of belt 30 and chain 31.

By the arrangement of power transmission above described it will be seen that the speed of each set of supplemental drawing rolls may be individually varied through the respective pulleys 27, 27, transmitting power to each set of rolls; also that the speed of the machine as a whole may be varied at the pulley 28′, so that the speed of the various elements of the mechanism may thus be harmonious and perfect co-operation between them secured.

As the sheet of glass forms from the molten mass, it assumes at the edges the form shown in Figs. 11 and 12, and as the thicker edge portions 32 pass between the sets of rolls 1, 2, which revolve in the direction shown by the arrows, such thicker portions are rolled down to a thickness corresponding to or somewhat greater than the main body of the sheet.

The rolls 1, 2, have knurled or milled peripheries to prevent their slipping, and by regulating their peripheral speed by means of the variable speed of pulleys 27, 27, they may be caused to overcome all of the resistance due to the varying thickness and plasticity of the molten glass entering into or forming the edge portions of the sheet below the rolls. By this means the respective sets of rolls act to overcome the additional resistance to the drawing operation due to the increased thickness and plasticity resulting from the lower temperature of the mass from which they are drawn, and there is thereby secured an equalization of the draft tension throughout the entire width of the sheet.

It will of course be understood that for the purpose of leading the water or other cooling fluid into and from the rolls 1, 2, flexible inlet conduits 8′, 8′, are connected to the pipes 8, and flexible outlet pipes 8″ are connected to the outlet points 7′, all as clearly illustrated in Fig. 5.

In some constructions of working chamber, it may not be necessary to provide the inlets or bays 17, shown in Fig. 2, if the construction of furnace is such that the areas of the molten glass from which the edge portions of the sheet emerge will be cooler than that portion of the molten glass intermediate the edge portions. In that case, the edge portions of the sheet would be drawn from such cooler areas after the manner illustrated in Figs. 10 and 13. In Figs. 14 and 15 there is shown an island of an upwardly projecting portion of refractory material from which the edge portions of the sheet could be drawn, while in Figs. 11 and 12 the edge portions of the sheet emerge from or immediately adjacent to the sides of the furnace itself.

I desire it distinctly understood that I do not wish to confine myself to any particular form or construction of apparatus herein shown for producing my edge-forming cooler areas, as any construction which will admit of obtaining an edge-forming or cooler area of the nature herein shown is within the spirit and scope of my invention. Moreover, while the burners 24 are shown herein as means by which the temperature of said cooler areas is properly regulated independently of the surrounding mass of glass, said burners are shown merely as illustrative of means which may be employed for this purpose, and any means which would perform this function are within the scope of the invention.

What is claimed is:—

1. The improvement in the art of glass working which consists in drawing a continuous sheet of glass from a mass of molten glass which is of lower temperature at the points from which the edge portions of the sheet are drawn than it is along the line from which the main body of the sheet is drawn, said drawing being accomplished by applying a drawing-power to the sheet as a whole and additional drawing power to the edge portions of the sheet.

2. The improvement in the art of glass working which consists in preparing a mass of molten glass with side portions cooler than the intermediate body of said mass, regulating the temperature of said side portions with relation to the temperature of said intermediate portion while always maintaining it below that of said intermediate portion, and then drawing a continuous sheet of glass by drawing the main body of a sheet of glass from said intermediate portion and the edge parts of the sheet from said cooler side portions of the molten mass.

3. The improvement in the art of glass working which consists in drawing a continuous sheet of glass from a mass of molten glass whose side portions are cooler than the middle or intermediate portions, and simultaneously applying more drawing power to the edge portions of the sheet than to the intermediate portion of said sheet.

4. The improvement in the art of glass working which consists in drawing a continuous sheet of glass from a molten mass of glass whose temperature is higher where the main body of said sheet issues from the molten mass than at the points where the side portions issue from said mass, said sheet being drawn by applying a uniform draft throughout the width of the sheet and a further or additional draft at the edge portions of the sheet.

5. The improvement in the art of glass working which consists in drawing a continuous sheet of glass from a mass of glass that is cooler at the points from which the edge portions of the sheet are drawn than it is along the line from which the main body of the sheet is drawn, and applying more drawing power to the edge portions than to the main body portion of the sheet.

6. The method of drawing continuous sheet glass which consists in producing relatively cool or less plastic areas in a mass of molten glass, drawing a sheet of glass from said mass of molten glass, of causing the edge portions of said sheet to be formed from said areas, and in tempering said areas independently of the surrounding mass.

7. The method of drawing sheet glass which consists in preparing a mass of molten glass having one degree of temperature and plasticity throughout the greater portion of area thereof and a relatively lower degree of temperature and plasticity at two several points thereof, and then drawing a continuous sheet of glass from said mass, the body of said sheet being formed from said area of higher temperature and degree of plasticity and the edge portions of said sheet being formed from said points of lower temperature and degree of plasticity, and equalizing the drawing tension throughout the transverse section of said sheet.

8. In an aparatus for drawing sheet glass, the combination of a working chamber and means for providing a mass of molten glass therein having two several areas of a relatively lower degree of temperature and plasticity than the main body of the molten mass, with means for drawing the main or central portion of a sheet of glass from that portion of the mass having a relatively high degree of temperature and plasticity, and supplemental means drawing the edge portions of the sheet of glass from those portions of the molten mass having a relatively lower degree of temperature and plasticity.

9. In an apparatus for drawing sheet glass, the combination of a working chamber for containing a mass of molten plastic glass, means for supplying heat to the main body of the molten mass in said chamber of a higher degree than that supplied to two several areas thereof, whereby the plasticity of the glass of said areas is of a less degree than that of the main body of the molten mass, with means for drawing a sheet of glass from said molten mass the edge portions of the sheet being drawn from said areas of lower temperature and plasticity and the main body of the sheet being drawn from the area of high temperature and plasticity.

10. In an apparatus for drawing sheet glass, the combination of a working chamber having oppositely disposed lateral bays, means for applying a higher degree of heat to the molten mass in the main chamber than is applied to the molten glass in said bays, and means for drawing a sheet of glass from said chamber with the edges of the sheet forming in or adjacent to said bays, the drafting means for the edge portions of the sheet being capable of a rate of movement different from that of the drafting means for the intermediate portion of the sheet.

11. In an apparatus for drawing sheet glass, the combination with a working chamber for containing a mass of molten glass, means for maintaining the temperature of two oppositely disposed areas of the molten mass in said chamber at a degree below that of the main body of the molten mass, means for drawing a sheet of glass from said molten mass, the edge portions of the sheet being drawn from said areas of lower temperature, and supplemental drawing means acting on the edge portions of the sheet.

12. In an apparatus for drawing sheet glass, the combination of a receptacle for containing a mass of molten glass, means for applying heat to the main body of the molten mass whereby said main body is heated to a higher degree of temperature than at two several points or areas thereof, means for independently modifying the temperature of said several points or areas, and means for drawing the central portion of the sheet of glass from said main body of the molten mass and the edge portions of the sheet from said points or areas of lower temperature.

13. In an apparatus for drawing sheet glass, the combination of a receptacle for containing a mass of molten glass, means for applying heat to the main body of the molten mass in said receptacle of a higher temperature than that applied to certain lateral points or areas of said molten mass, means for regulating the temperature of said lateral points or areas, a main sheet-drawing means for drawing a sheet of glass from said molten mass with its edge portions issuing from said areas of lower temperature and its main portion issuing from the main body of the molten glass in said receptacle, and supplemental drawing means acting on the edge portions of the sheet during the drawing operation.

14. The improvement in the art of glass working which consists in preparing a mass of molten glass with side portions of a different temperature than the intermediate body of said mass, regulating the temperature of said side portions with relation to the temperature of said intermediate body, and then continuously drawing the main body of a sheet of glass from said intermediate portion and the edge parts of the sheet from said side portions of the molten glass.

15. The improvement in the art of glass working which consists in drawing a sheet of glass from a mass of molten glass whose side portions are of a different temperature than the middle or intermediate portion, and simultaneously applying more drawing power to one portion of the sheet than to the other.

16. In an apparatus for drawing sheet glass, the combination of a receptacle for containing a mass of molten glass, means for drawing a sheet of glass therefrom, the means for drawing the central portion of the sheet being separate and independent from the means for drawing the edge portions of the sheet, and devices for driving the drawing means for the central portion of the sheet at a rate of speed differing from that of the rate of speed at which the edge-drawing means are driven.

17. The improvement in the art of glass working, which consists in drawing a continuous sheet of glass from a mass of molten glass which is of lower temperature at the points from which the edge portions of the sheet are drawn than it is along the line from which the main body of the sheet is drawn, said drawing being accomplished by applying a drawing power to the sheet as a whole and additional drawing power through cooled instrumentalities to the edge portions of the sheet.

18. The improvement in the art of glass working, which consists in drawing a continuous sheet of glass from a mass of molten glass that is cooler at the points from which the edge portions of the sheet are drawn than it is along the line from which the main body of the sheet is drawn, and applying more drawing power to the edge portions than to the main body portions of the sheet, said drawing power to the edge portions being applied through cooled instrumentalities.

19. In an apparatus for drawing sheet glass, the combination of a working chamber and means for providing a mass of molten glass therein having two several areas of a relatively lower degree of temperature and plasticity than the main body of the molten mass, with means for drawing the main or central portion of a sheet of glass from that portion of the mass having a relatively high degree of temperature and plasticity, supplemental means drawing the edge portions of the sheet of glass from those portions of the molten mass having a relatively lower degree of temperature and plasticity, and means for cooling said supplemental means.

20. In an apparatus for drawing sheet glass, the combination of a working chamber for containing a mass of molten plastic glass, means for supplying heat to the main body of the molten mass in said chamber of a higher degree than that supplied to two several areas thereof, whereby the plasticity of the glass of said areas is of a less degree than that of the main body of the molten mass, with means for drawing a sheet of glass from said molten mass, the edge portions of the sheet being drawn from said areas of lower temperature and plasticity and the main body of the sheet being drawn from the area of high temperature and plasticity, and means for cooling the edge-drawing means.

21. In an apparatus for drawing sheet glass, the combination with a working chamber for containing a mass of molten glass, means for maintaining the temperature of two oppositely disposed areas of the molten mass in said chamber at a degree below that of the main body of the molten mass, means for drawing a sheet of glass from said molten mass, the edge portions of the sheet being drawn from said areas of lower temperature, supplemental drawing means acting on the edge portions of the sheet, and means for cooling said supplemental edge-drawing means.

22. In an apparatus for drawing sheet glass, the combination of a receptacle for containing a mass of molten glass, means for applying heat to the main body of the molten mass whereby said main body is heated to a higher degree of temperature than at two several points or areas thereof, means for drawing the central portion of the sheet of glass from said main body of the molten mass and means located above said points or areas of lower temperature for drawing the edge portions of the sheet, and means for cooling said edge-drawing means.

23. The improvement in the art of glass working, which consists in drawing a sheet of glass from a mass of molten glass whose side portions are of a different temperature than the middle or intermediate portion, and simultaneously applying more drawing power to one portion of the sheet than to the other, said additional drawing power being applied through cooled instrumentalities.

24. In an apparatus for drawing sheet glass, the combination of a receptacle for containing molten glass, means for drawing a sheet of glass therefrom, the means for drawing the central portion of the sheet being separate and independent from the means for drawing the edge-portions of the sheet, devices for driving the drawing means for the central portion of the sheet at a rate of speed differing from that of the rate of speed at which the edge drawing means are driven, and means for cooling the edge drawing means.

25. In an apparatus for drawing sheet glass from a receptacle containing molten glass having two several areas of a relatively lower degree of temperature than the main body of the molten mass, the combination of means for drawing the sheet of glass from said receptacle said means comprising edge-drawing rolls located above and in close proximity to the molten mass at the edges of the sheet and above said areas, and means for drawing the central portion of the sheet separate and independent from the edge-drawing rolls, and devices for cooling the edge-drawing rolls.

In testimony whereof the petitioner has signed this specification.

[L. S.] THE LIBBEY-OWENS SHEET GLASS CO.,
By ARTHUR E. FOWLE,
*Treasurer.*

Attest:
CHAS. H. CLEMETSAN,
*Secretary.*